(12) United States Patent
Carberry et al.

(10) Patent No.: US 9,416,046 B2
(45) Date of Patent: Aug. 16, 2016

(54) METHODS OF LASER CLEAVING OPTICAL FIBERS

(71) Applicant: CORNING OPTICAL COMMUNICATIONS LLC, Hickory, NC (US)

(72) Inventors: Joel Patrick Carberry, Big Flats, NY (US); Anping Liu, Horseheads, NY (US); Barada Kanta Nayak, Painted Post, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/595,380

(22) Filed: Jan. 13, 2015

(65) Prior Publication Data
US 2015/0218038 A1    Aug. 6, 2015

Related U.S. Application Data

(60) Provisional application No. 61/936,476, filed on Feb. 6, 2014.

(51) Int. Cl.
*C03B 37/16* (2006.01)
*G02B 6/38* (2006.01)
*G02B 6/25* (2006.01)

(52) U.S. Cl.
CPC . *C03B 37/16* (2013.01); *G02B 6/25* (2013.01); *G02B 6/3833* (2013.01)

(58) Field of Classification Search
CPC .............................. C03B 37/16; C03C 25/62
USPC .......................................................... 65/392
See application file for complete search history.

(56) References Cited

U.S. PATENT DOCUMENTS

| | | | |
|---|---|---|---|
| 6,488,414 B1 * | 12/2002 | Dawes | G02B 6/241 385/141 |
| 7,142,741 B2 | 11/2006 | Osborne | 385/15 |
| 8,830,567 B2 * | 9/2014 | Lin | H01S 3/0057 359/341.1 |
| 9,089,931 B1 * | 7/2015 | Carberry | G02B 6/25 |
| 2008/0210362 A1 | 9/2008 | Douglass et al. | 156/153 |
| 2012/0263422 A1 * | 10/2012 | Lu | B29D 11/0075 385/85 |

FOREIGN PATENT DOCUMENTS

EP    1330331 B1    4/2009    ....... B23K 26/073

* cited by examiner

*Primary Examiner* — Mark Halpern

(57) ABSTRACT

A method cleaving an end portion of an optical fiber involves providing a ferrule having a first end, a second end, and a ferrule bore extending between the first and second ends. An optical fiber is inserted through the ferrule bore so that an end portion of the optical fiber extends past an end face on the second end of the ferrule. At least one laser beam is emitted from at least one laser and directed to be incident on the end portion of the optical fiber at a first location. The at least one laser beam is emitted and directed to have a maximum beam width that is less than an outer diameter of the optical fiber at the first location so that the at least one laser can be operated to form a hole in the optical fiber at the first location.

17 Claims, 6 Drawing Sheets

METHODS OF LASER CLEAVING OPTICAL FIBERS

PRIORITY APPLICATION

This application claims the benefit of priority under 35 U.S.C. §119 of U.S. Provisional Application Ser. No. 61/936,476, filed on Feb. 6, 2014, the content of which is relied upon and incorporated herein by reference in its entirety.

BACKGROUND

The disclosure relates generally to optical fibers and more particularly to methods of laser cleaving at least one optical fiber and systems related to such methods.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical connection to be established when the optical fiber is aligned with another optical fiber provided in the mating component (the other fiber optic connector or adapter).

The bore of the ferrule in a fiber optic connector may extend from a rear of the ferrule to a front of the ferrule. With such a design, an optical fiber can be passed through the ferrule so as to extend beyond an end face at the front of the ferrule. After securing the optical fiber relative to the ferrule (e.g., by using a bonding agent in the bore), an optical surface may be formed on the optical fiber. The optical surface is typically formed a precise distance from the end face of the ferrule according to very tight dimensional standards to reduce signal attenuation. For example, the optical surface of the optical fiber may need to be formed within a few microns of the end face of the ferrule.

One conventional method of forming an optical surface involves a mechanical cleaving step followed by several mechanical polishing steps. Such methods can be time-consuming and labor-intensive due to the number of polishing steps required to form the optical surface within a few microns of the end face of the ferrule. For example, it may be necessary to begin with coarse grit when mechanically polishing and switch to finer grits in subsequent polishing steps to carefully control the distance of the end of the optical fiber from the end face of the ferrule and to form an optical surface of high quality.

Various techniques for laser cleaving and polishing an optical fiber are also known. Although these techniques may help reduce or eliminate some of the mechanical polishing steps associated with forming an optical surface, there remains room for improvement. Using one or more lasers to form an optical surface sufficiently close to the end face of the ferrule without damaging the ferrule remains a challenge.

SUMMARY

One embodiment of the disclosure relates to a method cleaving an end portion of an optical fiber. The method involves providing a ferrule having a first end, a second end, and a ferrule bore extending between the first and second ends. An optical fiber is inserted through the ferrule bore so that an end portion of the optical fiber extends past an end face on the second end of the ferrule. At least one laser beam is emitted from at least one laser and directed to be incident on the end portion of the optical fiber at a first location. Additionally, the at least one laser beam is emitted and directed to have a maximum beam width that is less than an outer diameter of the optical fiber at the first location. The method further involves operating the at least one laser to form a hole in the optical fiber at the first location and cleaving the end portion of the optical fiber with the at least one laser.

Other embodiments are also disclosed of methods of cleaving an end portion of an optical fiber. According to another embodiment, the method involves providing a ferrule having a first end, a second end, and a ferrule bore extending between the first and second ends. An optical fiber is inserted through the ferrule bore so that an end portion of the optical fiber extends past an end face on the second end of the ferrule. At least one laser beam is emitted from at least one laser and directed to be incident on the end portion of the optical fiber at a plurality of locations. Additionally, the at least one laser beam is emitted and directed to have a maximum beam width that is less than an outer diameter of the optical fiber at each of the plurality of locations. The method further involves operating the at least one laser to form a plurality of holes in the optical fiber the plurality of locations (i.e., a hole at each of the different locations). The end portion of the optical fiber is cleaved by forming the holes.

Different ways of emitting and directing one or more laser beams and operating one or more lasers to form the holes at the plurality of locations are disclosed and, based on the disclosure, even further variations and possibilities will be appreciated. For example, the laser beam(s) may be incident on the optical fiber at the plurality of locations simultaneously, such as by operating multiple lasers at the same time or by splitting a laser beam from a single laser into a plurality of beams that are directed to be incident on the end portion of the optical fiber at the plurality of locations. Alternatively, the laser beam(s) may be incident on the optical fiber at the plurality of locations in a sequential manner, such as by successively operating multiple lasers that direct respective laser beams to different locations on the end portion of the optical fiber or by changing the relative position of a single laser with respect to the optical fiber after forming one of the holes and operating that single laser again.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
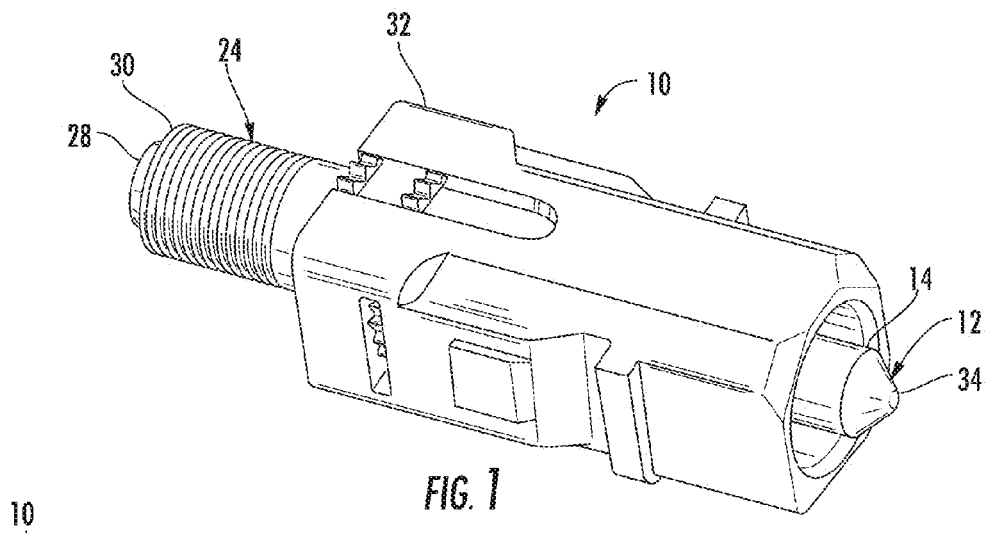
FIG. 1 a perspective view of an example of a fiber optic connector.
Figure 2:
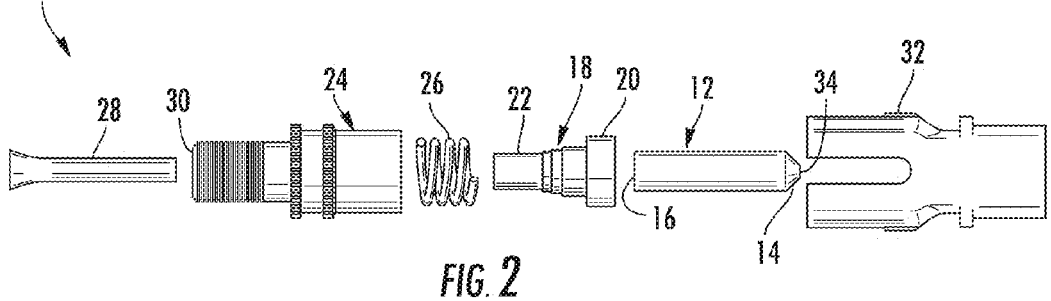
FIG. 2 is an exploded side view the fiber optic connector of FIG. 1.

Various embodiments will be further clarified by examples in the description below. In general, the description relates to methods and systems for laser cleaving on one or more optical fibers. The methods may be part of a cable assembly process for a fiber optic cable. That is, the methods may be part of terminating one or more optical fibers from a fiber optic cable with a fiber optic connector to form a cable assembly. One example of a fiber optic connector (also referred to as an "optical connector" or simply "connector") 10 for such a cable assembly is shown in FIGS. 1 and 2. Although the connector 10 is shown in the form of a SC-type connector, the methods described below may be applicable to processes involving different fiber optic connector designs. This includes ST, LC, FC, MU, MPO-type connectors, for example.

As shown in FIGS. 1 and 2, the connector 10 includes a ferrule 12 having a mating end 14 and an insertion end 16, a ferrule holder 18 having opposed first and second end portions 20, 22, and a connector body 24 (also referred to as an "inner housing" or "retention body" in some embodiments). The insertion end 16 of the ferrule 12 is received in the first end portion 20 of the ferrule holder 18 while the mating end 14 remains outside the ferrule holder 18. The second end portion 22 of the ferrule holder 18 is received in the inner housing 24. A spring 26 may be disposed around the second end portion 22 and configured to interact with walls of the inner housing 24 to bias the ferrule holder 18 (and ferrule 12). Additionally, a lead-in tube 28 may extend from a rear end 30 of the inner housing 24 to within the second end portion 22 of the ferrule holder 18 to help guide the insertion of an optical fiber (not shown in FIGS. 1 and 2) into the ferrule 12. An outer shroud 32 is positioned over the assembled ferrule 12, ferrule holder 18, and inner housing 24, with the overall configuration being such that the mating end 14 of the ferrule 12 presents an end face 34 configured to contact a mating component (e.g., another fiber optic connector; not shown).

In a manner not shown herein, a fiber optic cable providing the optical fiber also includes one or more layers of material (e.g., strength layer of aramid yarn) that may be crimped onto the rear end 30 of the inner housing 24. A crimp band may be provided for this purpose. Additionally, a strain-relieving boot may be placed over the crimped region and extend rearwardly to cover a portion of the fiber optic cable. Variations of these aspects will be appreciated by persons skilled in the design of fiber optic cable assemblies. Again, the embodiment shown in FIGS. 1 and 2 is merely an example of a fiber optic connector that may be used in the systems and methods described below. The general overview has been provided simply to facilitate discussion of the systems and methods.

Figure 3:
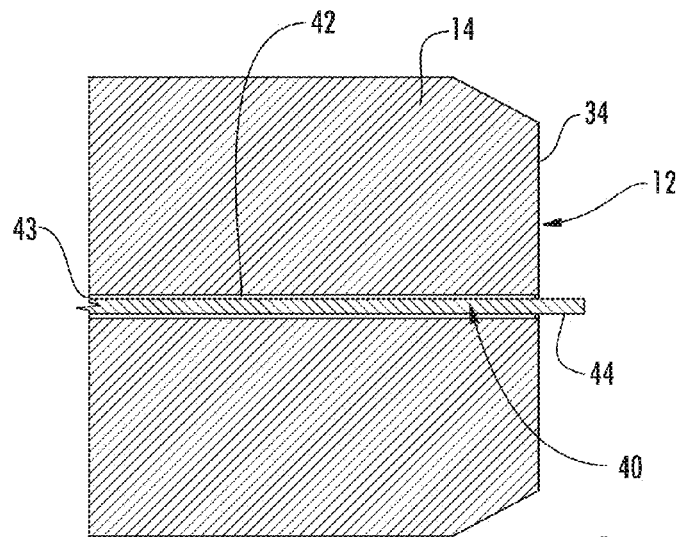
FIG. 3 is a cross-sectional side view of a portion of a ferrule of the fiber optic connector of FIG. 1, wherein an optical fiber is secured in the ferrule by a bonding agent.

FIG. 3 illustrates a portion of the ferrule 12 in further detail after an optical fiber 40 has been inserted into a ferrule bore (also referred to as a "micro-hole") 42. The optical fiber 40 is inserted from a rear of the ferrule bore 42 and extended until an end portion 44 of the optical fiber exits an opening on the end face 34 of the ferrule 12. Thus, the end portion 44 protrudes past the end face 34. At least a portion of the optical fiber 44 remaining in the ferrule bore 42 is secured to the ferrule 12 by a bonding agent 46 (also referred to as an "adhesive composition"). Securing the optical fiber 40 relative to the ferrule 12 facilitates cleaving the end portion 44 of the optical fiber 40, although the methods of cleaving disclosed herein may be performed prior to inserting and/or securing the optical fiber 40 in the ferrule 12 if desired. The methods involve using one or more lasers to cleave the optical fiber 40.

Figure 4:
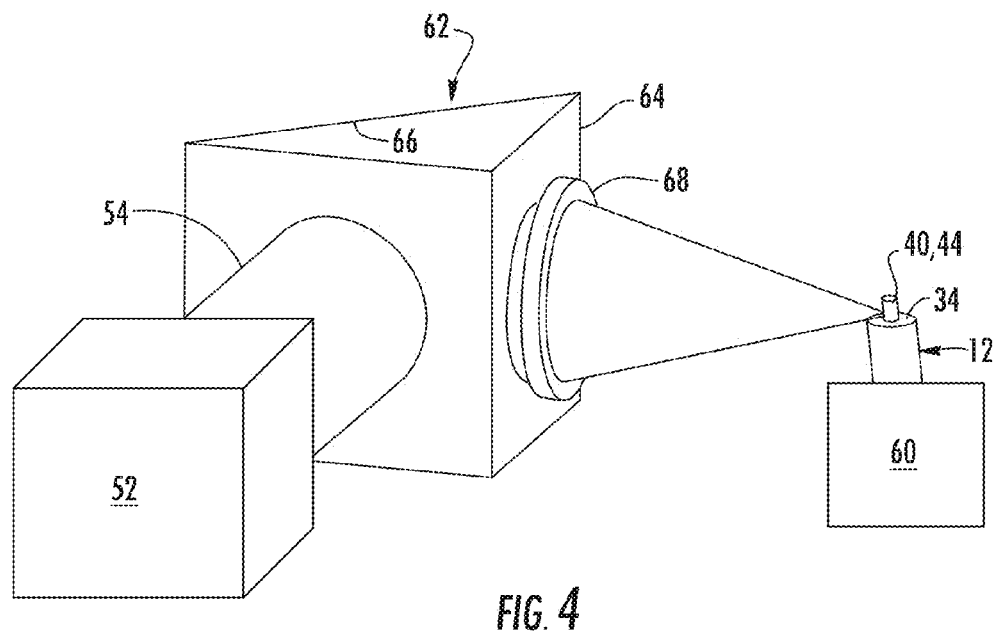
FIG. 4 is a schematic perspective view of one embodiment of a laser cleaving system.

To this end, FIG. 4 schematically illustrates one embodiment of a laser cleaving system 50 having a laser 52 configured to emit a laser beam 54 that ultimately cleaves the end portion 44 of the optical fiber 40. In this embodiment, the optical fiber 40 has been inserted through and secured within the ferrule bore 42 consistent with FIG. 3. A fixture 60 securely supports the ferrule 12 relative to the laser 52, which may be a $CO_2$ laser, quantum cascade laser, UV-excimer laser, semiconductor laser, or the like, and which may emit a laser beam with a wavelength between 0.2 and 11 μm.

There are different ways in which the laser beam 54 may be directed from the laser 52 to the end portion 44 of the optical fiber 40. In the embodiment shown in FIG. 4, the laser 52 directs the laser beam 54 to a focusing system 62, which includes an enclosure 64 having a reflective mirror 66 that changes the direction of the laser beam 54 by approximately 90°. The focusing system 62 also includes one or more beam-shaping elements, such as a lens 68, configured to re-shape the laser beam 54 to have a desired geometric profile (circular, elliptical, etc.; when viewed perpendicular to a propagation direction of the laser beam 54). Thus, the lens 68 may be spherical, cylindrical, acylindrical, etc., and may be the only lens or one of several lenses in the focusing system 62. Again, FIG. 4 merely illustrates one of many possible embodiments emitting and directing a laser beam to be incident on the end portion 44 of the optical fiber 40.

Figure 5:
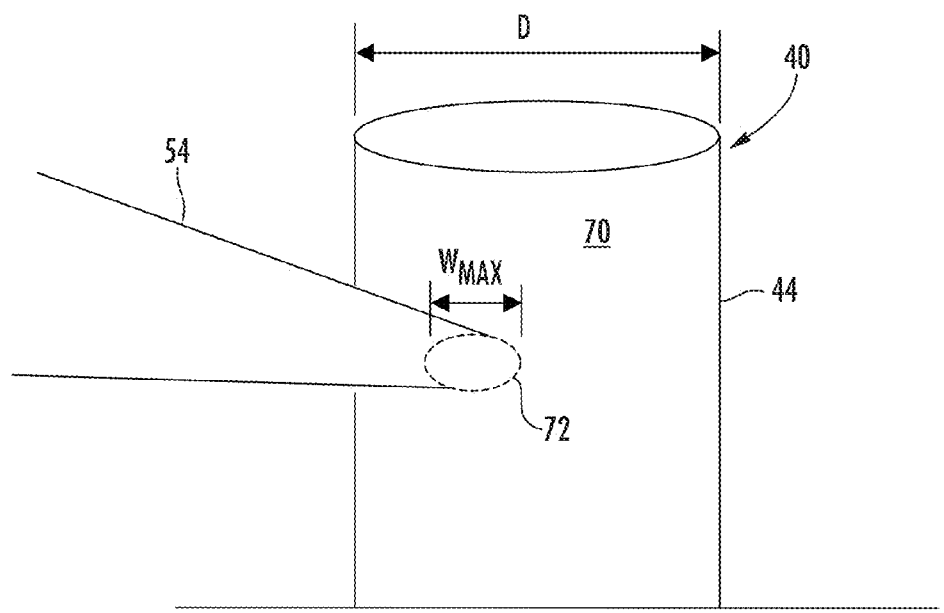
FIG. 5 is a schematic view of a laser beam being used to form a hole in an outer surface of an end portion of an optical fiber.

For a better understanding of the methods of the present disclosure, reference can be made to FIG. 5, which schematically illustrates the laser beam 54 being incident on an outer surface 70 of the end portion 44 of the optical fiber 40. As shown in FIG. 5, the laser beam 54 is emitted and directed to have a maximum beam width $W_{max}$ that less than an outer diameter D of the optical fiber 40 at the location where the laser beam 54 is incident on the optical fiber 40. Doing so enables the laser 52 (FIG. 4) to be operated to form a hole 72 in the outer surface 70 or the optical fiber 40. That is, the laser 52 may be operated to form a cavity or pit in the outer surface 70 of the optical fiber 40. The formation of a single hole may be sufficient to cleave the optical fiber 40, such as by generating residual stresses that impart a crack across an entire region of the optical fiber 40. Additionally, the hole need not extend through the optical fiber 40 for the cleave to occur. However, as will be described in greater detail below, certain advantages may be obtained by forming a plurality of holes in a plurality of different locations on the end portion 44 to cleave the optical fiber 40.

In some embodiments, the maximum beam width $W_{max}$ may be between 15% and 80% of the outer diameter D of the optical fiber 40 at the location where the laser beam 54 is incident on the optical fiber. In other embodiments, the maximum beam width $W_{max}$ may be between 15% and 50% of the outer diameter D at the location where the laser beam 54 is incident on the optical fiber 40. The power/fluence, wavelength, operation mode (e.g., continuous or pulsed), operation time (e.g., pulse duration and rate), polarization of the laser beam 54, and/or other parameters associated with operation of the laser 52 may be chosen so that the hole(s) 72 formed by the laser 52 have a desired depth relative to a nominal outer diameter of the optical fiber 40 (i.e., the outer diameter of the optical fiber 40 prior to laser processing). For example, the hole or holes formed by operating the laser 52 may have a depth that is between 5% and 50% of the nominal outer diameter, or even between 5% and 30% of the nominal outer diameter in some embodiments.

Figure 6:
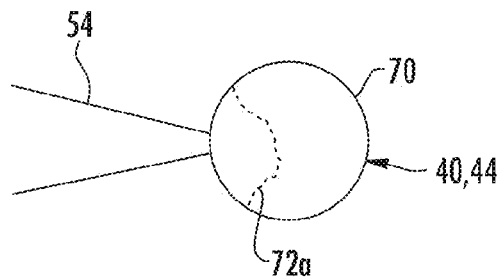
FIGS. 6-9 are schematic views sequentially illustrating an optical fiber being laser processed according to an exemplary method of this disclosure.

FIGS. 6-9 sequentially illustrate an optical fiber 40 being cleaved according to an example method of this disclosure. As schematically shown in FIG. 6, the laser beam 54 is directed to be incident on the end portion 44 of the optical fiber 40 at a first location. The laser 52 is operated to melt and/or ablate some of the material of the optical fiber 40, thereby forming a hole 72a at the first location. Now referring to FIG. 7, the laser beam 54 is then directed to be incident on the end portion 44 of the optical fiber 40 at a second location. This may be accomplished by moving the laser 52 relative to the fixture 60 (FIG. 4) to bring the laser 52 into a different position with respect to the optical fiber 40. Alternatively, the laser 52 may remain stationary while the optical fiber 40 is rotated relative to the laser 52 (e.g., by the fixture 60 rotating the ferrule 12). Even further, both the laser 52 and optical fiber 40 may be moved in some embodiments. High magnification microscopes and/or high precision gauges (not shown) may be used during initial and any subsequent positioning of components to help ensure that the laser beam 54 is incident on the optical fiber 40 at the desired locations.

Figure 7:
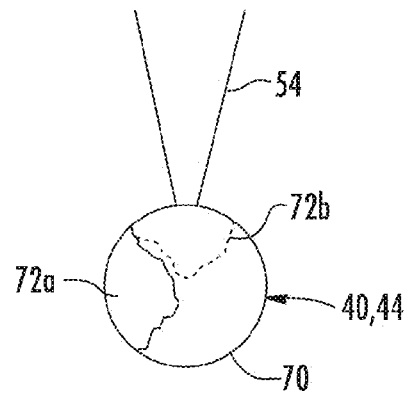

Still referring to FIG. 7, the laser 52 is eventually operated to form a hole 72b in the optical fiber 40 at the second location. The second location is shown as being spaced approximately 90° from the first location (when viewed in a plane perpendicular to an optical axis along which the optical fiber 40 extends). The hole 72b formed at the second location may or may not overlap the hole 72a formed at the first location.

Figure 8:
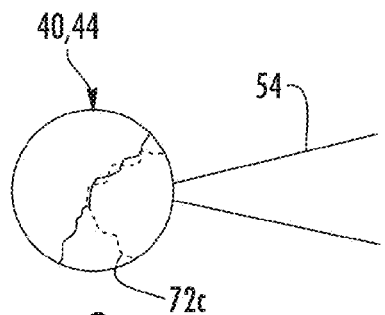
Figure 9:
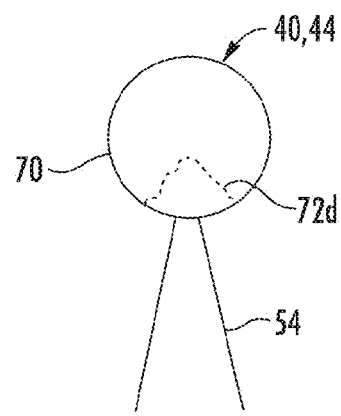

This process of directing the laser beam 54 to be incident on the end portion 44 of the optical fiber 40 at a different location and operating the laser 52 to form a hole 72 at the different location may be repeated a number of times (e.g., two, three, four, etc.). For example, FIG. 8 illustrates the laser beam 54 being directed to be incident on the end portion 44 of the optical fiber 40 at a third location to form a hole 72c at the third location. FIG. 9 illustrates the laser beam 54 being directed to be incident on the end portion 44 of the optical fiber 40 at a fourth location to form a hole 72d at the fourth location. Thus, a plurality of holes may be formed in the end portion 44 of the optical fiber 40 at a corresponding plurality of different locations. The locations (and, therefore, holes) may be equally or substantially equally distributed around a circumference of the end portion 44 of the optical fiber 40, as shown in FIGS. 6-9, although other spacing arrangements/distributions are possible.

Forming the holes eventually cleaves the end portion 44 of the optical fiber 40. For example, when forming the final hole 72d, the laser beam 54 may induce sufficient residual stress in the optical fiber 40 to result in the end portion 44 breaking off in the region of the holes 72a-72d. This process may be assisted by pre-stressing the optical fiber 40, such as by bending the optical fiber 40 or otherwise placing the optical fiber 40 in tension. Alternatively, the holes 72a-72d may be sized in a manner that results in the laser 52 ablating and/or melting all material in a short region of the end portion 44.

Regardless, forming holes to cleave the end portion 44 of the optical fiber 40 has several advantages. A primary advantage is that there is less potential for damage to the end face 34 of the ferrule 12 compared to conventional processes. The laser beam 54 is focused into a small area on the optical fiber 40 whenever the laser 52 is operated; no part of the laser beam 54 is incident on the end face 34 of the ferrule 12. Thus, the possibility of the end face 34 cracking due to absorption of laser energy and thermal expansion is minimized. Additionally, by delivering a large amount of energy into confined regions, the material of the optical fiber 40 may be more effectively melted and ablated. This may results in smaller amounts/particles of debris (e.g., molten pieces of the optical fiber 40) being generated. Such debris carries less energy and is less likely to thermally damage the end face 34 of the ferrule 12.

A net result of these and other advantages is that methods disclosed herein may be used to form an optical surface 80 close to the end face 34 of the ferrule 12 (i.e., to provide a "close" cleave). The locations on the optical fiber 40 where the holes 72 are formed may be less than 20 tm from the end face 34, or even less than 15 tm from the end face 34, to result in the optical surface 80 being formed within these ranges. As used herein, the term "optical surface" refers to an end surface of the optical fiber 40 that requires minimal or no further processing before being used to optically couple the fiber optic connector 10 to a mating device. Thus, after forming the optical surface 80 using methods and systems disclosed herein, there may still be a quick mechanical polish or laser polish of the optical surface into a final form. Any polishing is nevertheless significantly less extensive compared to conventional approaches where the end portion 44 of the optical fiber 40 is not first processed by a laser cleaving system. The optical surface having a maximum and minimum distance from the end face 34 of the ferrule 12 that is within 10 μm of distance associated with the final form can be considered to involve "minimal processing."

Figures 10A, 10B, 10C:
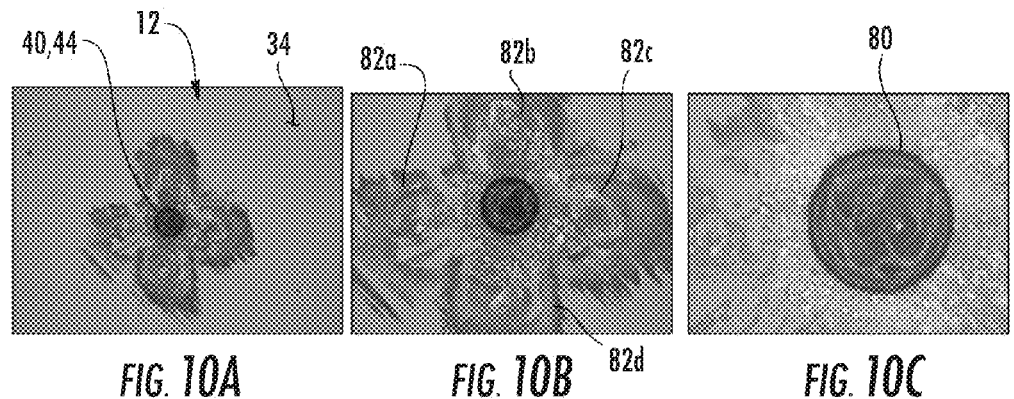
FIGS. 10A-10C are top close-up views of an exemplary optical surface of an optical fiber extending from an end face of a ferrule after laser cleaving observed at a first, second, and third magnification levels, respectively.
Figures 11A, 11B, 11C:
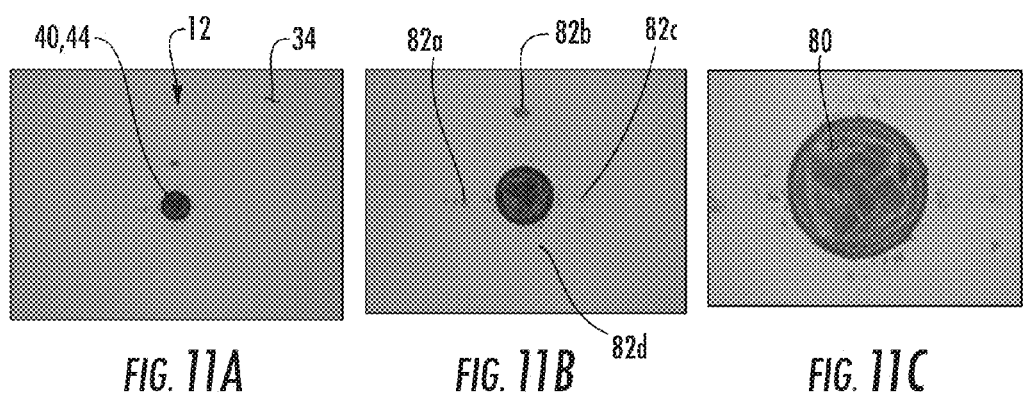
FIGS. 11A-11C are top close-up views of the optical surface and the end face of FIGS. 10A-10C, respectively, after subsequent wiping with isopropyl alcohol.
Figures 12A, 12B, 12C:
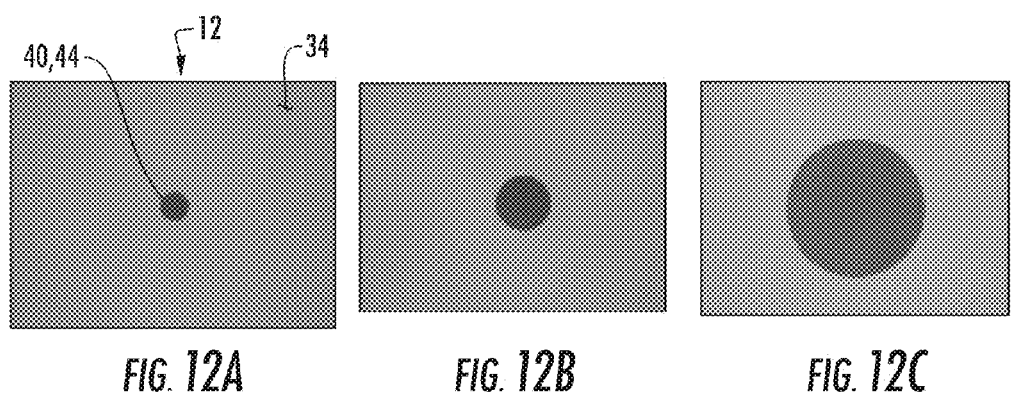
FIGS. 12A-12C are top close-up views of the optical surface and the end face of FIGS. 11A-11C, respectively, after subsequent hand polishing.

With this in mind, FIGS. 10A-10C are top close-up views of an exemplary optical surface 80 of an optical fiber 40 at first, second, and third magnification levels, respectively, The optical fiber 50 comprises silica, and the the optical surface 80 was formed using a laser cleaving system that operated in a manner consistent with the principles described above. In this specific example, a $CO_2$ laser with an operating wavelength of 10.6 μm was used to form holes in the outer surface of the optical fiber 40 at approximately 0°, 90°, 180°, and 270° locations. Ablated material of the optical fiber 40 generated by forming the holes was disposed as ablated material buildup areas 82a-82d on the end face 34 of the ferrule 12. FIGS. 11A-11C are top close-up views of the optical surface 80 and the end face 34 of FIGS. 10A-10C, respectively, at different magnification levels after subsequent wiping with isopropyl alcohol. The ablated material buildup areas 82a-82d may be substantially reduced. FIGS. 12A-12C are top close-up views of the optical surface 80 and the end face 34 of FIGS. 11A-11C, respectively, after subsequent hand polishing. The ablated material buildup areas 82a-82d appear gone, as do the variations/depressions 84 such that the optical surface 80 is now in a final form. Advantageously, the end face 34 of the ferrule 12 remains free of cracks and other damage typically associated with excessive thermal absorption and/or expansion.

The principles described above may be applicable to systems having a variety of configurations. Several examples will now be described, although only differences from the laser cleaving system 50 will be discussed for clarity and conciseness.

Figure 13:
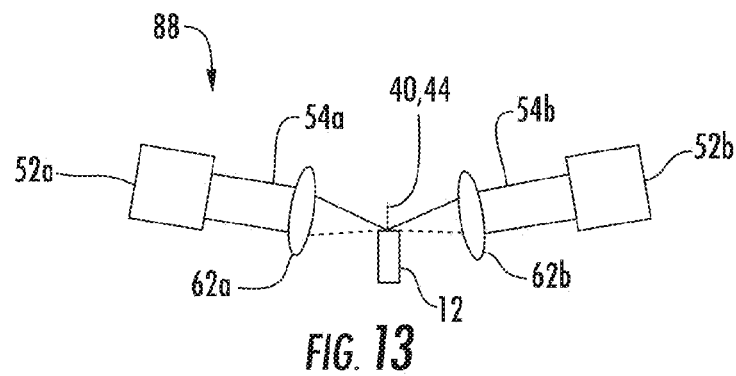
FIG. 13 is a schematic view of another embodiment of a laser cleaving system.

To this end, FIG. 13 schematically illustrates an example of a laser cleaving system 88 in which two laser beams 54a, 54b are used to form the optical surface on the end portion 44 of the optical fiber 40. The laser beams 54a, 54b may be emitted from respective lasers 52a, 52b and directed to the optical fiber by respective focusing systems 62a, 62b. Each laser beam 54a, 54b is incident on the end portion of the optical fiber at a different location to form respective holes at those different locations. The lasers 52a, 52b may be operated simultaneously, in succession, or even in an alternating manner (e.g., pulsing one laser and then pulsing the other) to form the holes simultaneously, substantially simultaneously, or in succession. Although only two lasers 52a, 52b are shown in FIG. 13, embodiments involving a different number of lasers and laser beams will be appreciated (e.g., three or four lasers and laser beams).

Figure 14:
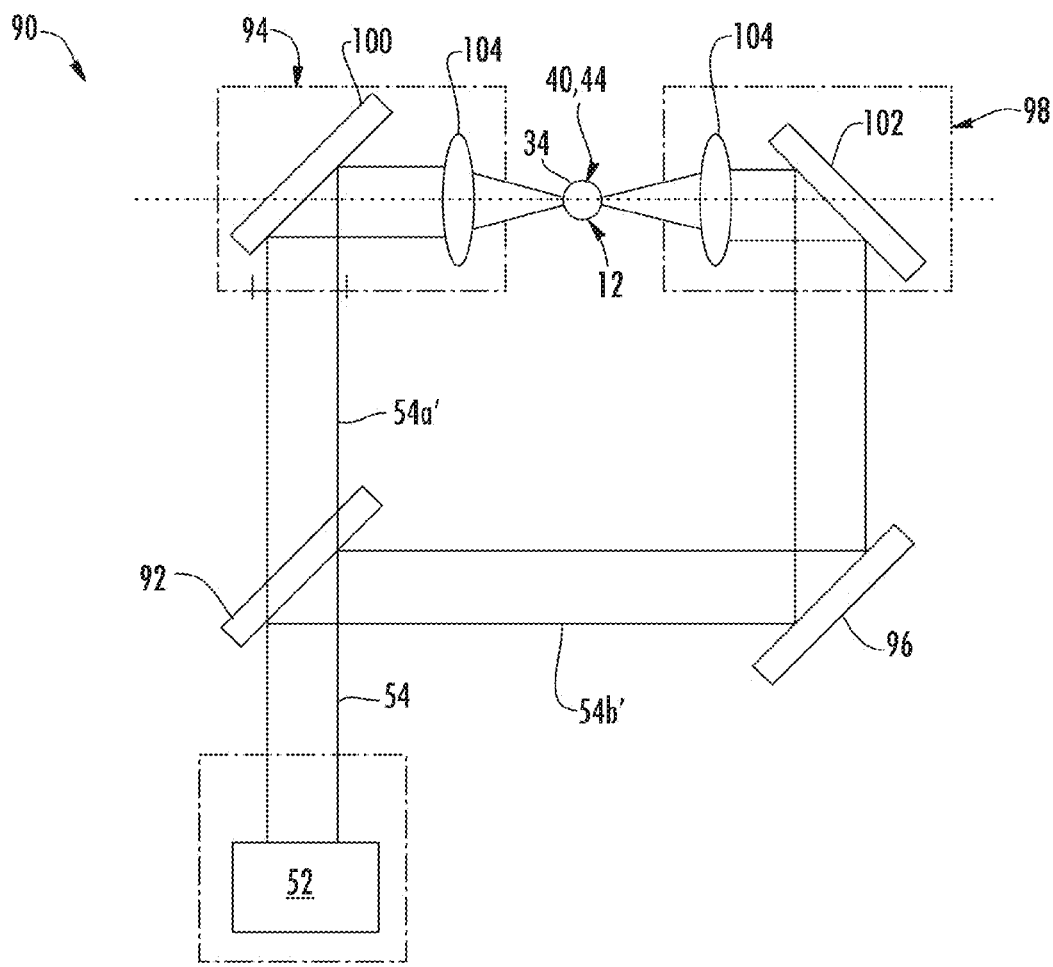
FIG. 14 is a schematic diagram of yet another embodiment of a laser cleaving system.
Figure 15:
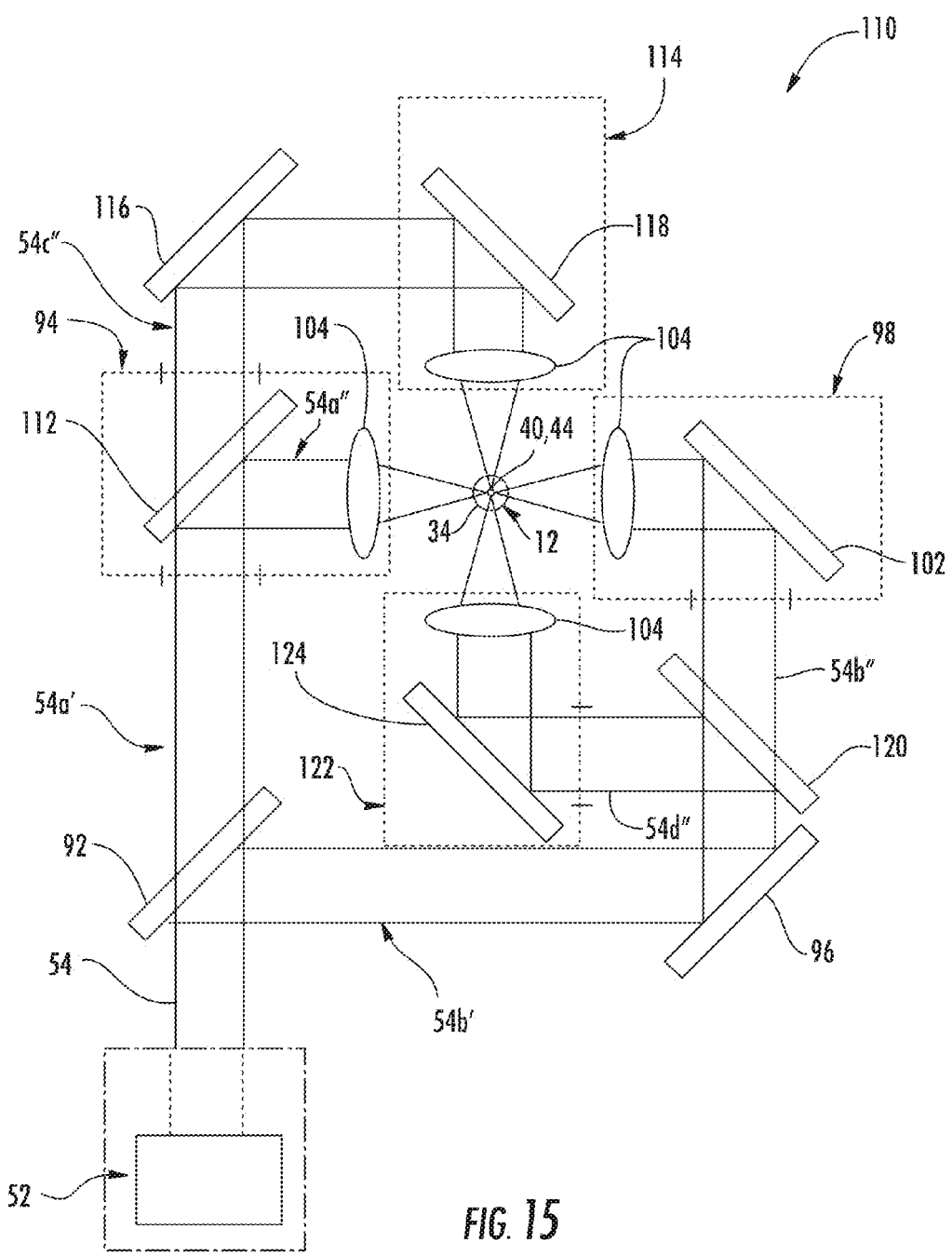
FIG. 15 is a schematic diagram of yet another embodiment of a laser cleaving system.

Embodiments will also be appreciated where one or more lasers 52 emit a laser beam 54 that is split into different portions that are directed to be incident on the end portion 44 of the optical fiber 40 at different locations. FIGS. 14 and 15 are schematic diagrams of laser cleaving systems 90, 110 according to such embodiments. As can be seen in FIG. 14, the laser cleaving system 100 includes a beam splitter 92 to direct a first portion 54a' of the laser beam emitted by the laser to a first focusing system 94 and a second portion 54b' of the laser beam to a reflective mirror 96. The reflective mirror 96, in turn, directs the second portion 54a' to a second focusing system 98. The first and second focusing systems 94, 98 include respective first and second reflective mirrors 100, 102 to direct the first and second portions 54a', 54b' through one or more beam-shaping elements 104 (e.g., the cylindrical lens 64 and spherical lens 68 in FIG. 68) and toward first and second locations on the end portion 44 of the optical fiber 40. The manner in which the first and second portions 54a', 54b' are directed to and incident on the optical fiber 40 may be similar to the laser beams 54a, 54b of the laser cleaving system 80 (FIG. 13).

Now referring to FIG. 15, the laser cleaving system 110 is similar to the laser cleaving system 90, but the first reflective mirror 100 is replaced by a beam splitter 112. The beam splitter 112 splits the first portion 54a' of the laser beam into a portion 54a" that is directed through the beam-shaping elements 104 and toward the end face 34 of the ferrule 12 and a portion 54c" that is directed to a third focusing system 114 by a reflective mirror 116. The third focusing system 114, which may include a reflective mirror 118 and beam-shaping elements 104, directs the portion 54c" to a third location on the end portion 44 of the optical fiber 40. Another difference from the laser cleaving system 90 (FIG. 10) is that the laser cleaving system 110 includes a beam splitter 120 to split the second portion 54b' of the laser beam 54 into a portion 54b" that is directed to the second focusing system 98 and a portion 54d" that is directed to a fourth focusing system 122. The fourth focusing system 122, which may include a reflective mirror 124 and beam-shaping elements 104, directs the portion 54d" to a fourth location on the end portion 44 of the optical fiber 40.

In any laser cleaving system according to this disclosure, the laser(s) may be used during other steps of the cable assembly process. For example, the laser(s) may be used to heat the bonding agent 46 (FIG. 3) prior to or during insertion of the optical fiber 40 into the ferrule bore 42. The bonding agent 46 may be heated to a temperature sufficient to melt the bonding agent 46, as mentioned above. After inserting the optical fiber 40 into the ferrule bore 42, the bonding agent 46 is cooled to secure the optical 40 in the ferrule 12. The ferrule 12 and bonding agent 46 may be passively cooled or actively cooled, for example by blowing air to speed the cooling and solidification process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. For example, although FIGS. 6-9 illustrate four holes 72a-72d being formed in the optical fiber 40, in alternative embodiments there be a different number of holes (e.g., three holes). It is believed that six or less holes represents a desirable balance between minimizing processing complexity, reducing the potential for damage to the end face of the ferrule from debris, and producing a quality optical surface on the optical fiber.

Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of forming an optical surface on an end portion of an optical fiber, comprising:
   providing a ferrule having a first end, a second end, and a ferrule bore extending between the first and second ends;
   inserting an optical fiber through the ferrule bore so that an end portion of the optical fiber extends past an end face on the second end of the ferrule;
   emitting at least one laser beam from at least one laser;
   directing the at least one laser beam to be incident on the end portion of the optical fiber at a plurality of locations, wherein the laser beam is emitted and directed to have a maximum beam width that is less than an outer diameter of the optical fiber at each of the plurality of locations; and operating the at least one laser to form a plurality of holes in the optical fiber at the plurality of locations, wherein the end portion of the optical fiber is cleaved by forming the holes.

2. A method according to claim 1, wherein the at least one laser beam is emitted and directed to have a maximum beam width that is between 15% and 80% of the outer diameter of the optical fiber at each of the plurality of locations.

3. A method according to claim 2, wherein the at least one laser beam is emitted and directed to have a maximum beam width that is between 15% and 50% of the outer diameter of the optical fiber at each of the plurality of locations.

4. A method according to claim 1, wherein each hole formed by operating the at least one laser has a depth relative to a nominal outer diameter of the optical fiber that is between 5% and 50% of the nominal outer diameter.

5. A method according to claim 4, wherein each hole formed by operating the at least one laser has a depth relative to the nominal outer diameter of the optical fiber that is between 5% and 30% of the nominal outer diameter.

6. A method according to claim 1, wherein the emitting, directing, and operating steps are repeated a plurality of times with the at least one laser in a corresponding plurality of different positions relative to an outer surface of the end portion of the optical fiber to form the plurality of holes in the end portion of the optical fiber.

7. A method according to claim 6, wherein the emitting, directing, and operating steps are repeated three or more times.

8. A method according to claim 7, wherein the emitting, directing, and operating steps are repeated six or less times.

9. A method according to claim 6, wherein the optical fiber is rotated relative to the at least one laser to bring the at least one laser into the plurality of different positions relative to the outer surface of the end portion of the optical fiber.

10. A method according to claim 6, wherein each hole formed by the at least one laser does not extend through the optical fiber.

11. A method according to claim 1, wherein the plurality of holes are equally distributed around the end portion of the optical fiber.

12. A method according to claim 1, wherein the at least one laser is operated to cleave the end portion of the optical fiber less than 20 µm from the end face of the ferrule.

13. A method according to claim 1, wherein the ferrule is provided with a bonding agent in the ferrule bore, the method further comprising:
   operating the at least one laser to heat the bonding agent to a temperature sufficient to melt the bonding agent; and
   cooling the bonding agent to secure the optical fiber in the ferrule bore, wherein the optical fiber is secured in the ferrule bore before operating the at least one laser to cleave the end portion of the optical fiber.

14. A method according to claim 1, wherein each hole formed by the at least one laser does not extend through the optical fiber.

15. A method according to claim 1, wherein multiple lasers are used to perform the emitting, directing, and operating steps to form the plurality of holes.

16. A method according to claim 1, wherein emitting at least one laser beam from at least one laser comprises emitting a single beam from a single laser, the method further comprising:
   splitting the single beam into a plurality of beams that are directed to be incident on the end portion of the optical fiber at the plurality of locations.

17. A method according to claim 1, wherein the holes are simultaneously formed at the plurality of locations.

* * * * *